(12) United States Patent  (10) Patent No.: US 12,393,123 B2
Im et al.  (45) Date of Patent: Aug. 19, 2025

(54) OPTICAL PROXIMITY CORRECTION METHOD, MASK MANUFACTURING METHOD AND SEMICONDUCTOR CHIP MANUFACTURING METHOD USING THE SAME

(71) Applicant: Samsung Electronics Co., Ltd., Suwon-si (KR)

(72) Inventors: Wonjoo Im, Yongin-si (KR); Noyoung Chung, Hwaseong-si (KR); Sanghwa Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 631 days.

(21) Appl. No.: 17/739,752

(22) Filed: May 9, 2022

(65) Prior Publication Data

US 2023/0071777 A1  Mar. 9, 2023

(30) Foreign Application Priority Data

Sep. 6, 2021 (KR) .................. 10-2021-0118357

(51) Int. Cl.
*G03F 7/00* (2006.01)
*G03F 1/36* (2012.01)
*G06F 30/398* (2020.01)
*G06F 119/18* (2020.01)

(52) U.S. Cl.
CPC ............ *G03F 7/70441* (2013.01); *G03F 1/36* (2013.01); *G06F 30/398* (2020.01); *G06F 2119/18* (2020.01)

(58) Field of Classification Search
CPC ................................ G03F 1/36; G03F 7/70441
USPC ....................................................... 430/5, 30
See application file for complete search history.

(56) References Cited

U.S. PATENT DOCUMENTS

| | | |
|---|---|---|
| 7,975,246 B2 | 7/2011 | Dunn et al. |
| 8,103,977 B2 | 1/2012 | Taoka et al. |
| 8,316,327 B2 | 11/2012 | Herold |
| 9,355,209 B2 | 5/2016 | Chuang et al. |
| 9,811,615 B2 | 11/2017 | Lippincott et al. |
| 10,866,505 B2 * | 12/2020 | Huang ..................... G03F 1/70 |
| 10,922,472 B2 | 2/2021 | Kang et al. |
| 2019/0187552 A1 | 6/2019 | Choi et al. |
| 2021/0116800 A1 | 4/2021 | Kang |

FOREIGN PATENT DOCUMENTS

KR  10-2021-0046459 A  4/2021

* cited by examiner

*Primary Examiner* — Mark F. Huff
(74) *Attorney, Agent, or Firm* — Muir Patent Law, PLLC

(57) ABSTRACT

A method of manufacturing a semiconductor chip includes designing a layout for a semiconductor chip, performing an optical proximity correction (OPC) on the layout, manufacturing a mask after performing the OPC, and manufacturing the semiconductor chip using the mask, wherein a plurality of OPC shapes corresponding to a rectangular pattern of the mask are included in the mask and at least one of the plurality of OPC shapes includes a multi-edge corner rounding OPC shape.

17 Claims, 18 Drawing Sheets

OPTICAL PROXIMITY CORRECTION METHOD, MASK MANUFACTURING METHOD AND SEMICONDUCTOR CHIP MANUFACTURING METHOD USING THE SAME

CROSS-REFERENCE TO RELATED APPLICATION(S)

This application claims benefit of priority under 35 U.S.C. § 119 to Korean Patent Application No. 10-2021-0118357 filed on Sep. 6, 2021 in the Korean Intellectual Property Office, the disclosure of which is incorporated herein by reference in its entirety.

BACKGROUND

The present inventive concept relates to an optical proximity correction (OPC), a mask manufacturing method using the same, and a semiconductor chip manufacturing method.

In general, patterns of semiconductor chips are formed by a photolithography process and an etching process. First, a pattern is designed, and a layout of the pattern is formed on a wafer to make a semiconductor chip. When a circuit pattern is transferred onto a wafer form a mask through the photolithography process to form a circuit pattern (hereinafter, referred to as a "transferred circuit pattern") on the wafer, there may be differences between the transferred circuit pattern on the wafer and the designed circuit pattern on the mask. Such differences may be due to an optical proximity effect in the photolithography process or a loading effect in the etching process. As a method for accurately transferring a circuit pattern on a mask onto a wafer, a process proximity correction (PPC) technology for correcting a circuit pattern on a mask in consideration of deformation of a transferred circuit pattern on the wafer is used. The process proximity correction technology predicts and analyzes the optical proximity effect and the loading effect in advance and corrects the layout of the circuit pattern on the mask according to an analysis result, and the OPC method is mainly used in the photolithography process. The OPC method is divided into model-based OPC and rule-based OPC. The model-based OPC is a method of correcting a circuit pattern of a mask by applying one model to all chips (full-chip) on a wafer. The rule-based OPC is a method of correcting a circuit pattern of a mask by applying one rule to all chips on a wafer.

SUMMARY

An aspect of the present inventive concept is to provide an optical proximity correction (OPC) method for overcoming a diffraction limit of a beam, and a mask manufacturing method and a semiconductor chip/device manufacturing method using the same.

An object of the present inventive concept is to provide an OPC method for reducing process costs, and a mask manufacturing method and a semiconductor chip/device manufacturing method using the same.

According to an aspect of the present inventive concept, a method of manufacturing a semiconductor chip includes: designing a layout for a semiconductor chip; performing an optical proximity correction (OPC) on the layout; manufacturing a mask corresponding to the layout after performing the OPC; and manufacturing the semiconductor chip using the mask, wherein a plurality of OPC shapes corresponding to a rectangular pattern of the mask are included in an OPC model and at least one of the plurality of OPC shapes includes a multi-edge corner rounding OPC shape.

According to another aspect of the present inventive concept, an optical proximity correction (OPC) method for manufacturing a semiconductor chip includes: selecting a multi-edge target pattern among rectangular patterns; corner-chopping the selected rectangular shape to generate a multi-edge; generating an evaluation point on each multi-edge; performing an OPC simulation by rounding at each angle; calculating an edge placement error (EPE) at the evaluation point; determining whether a calculated value is lower than a previous iteration value; determining whether the number of performing the simulation is a last iteration when the calculated value is lower than the previous iteration value; determining whether there is no mask rule check (MRC) violation when the number of performing the simulation is the last iteration; and determining a final OPC shape when there is no MRC violation.

According to another aspect of the present inventive concept, a method of manufacturing a mask for a semiconductor chip includes: performing an OPC on a layout; receiving mask tape-out (MTO) design data after perform the OPC; performing mask data preparation after receiving the MTO design data; performing an exposure process on a substrate for a mask based on mask data using an electronic beam after performing the mask data preparation; and forming a mask by performing a developing, etching or cleaning process after the exposure process, wherein the performing of an OPC includes: selecting first targets, on which a first OPC is to be performed, among rectangular patterns; selecting second targets, on which a second OPC is to be performed, among the first targets; performing the first OPC on the first targets excluding the second targets; and performing the second OPC on the second targets.

According to another aspect of the present inventive concept, a computing device performing an optical proximity correction (OPC) includes: at least one memory device configured to store at least one instruction; and at least one processor configured to execute the at least one instruction, wherein the at least one processor selects a multi-edge corner rounding OPC shape target from a layout; and executes at least one instruction to perform a multi-edge corner rounding OPC on the selected target.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Hereinafter, example embodiments of the present inventive concept will be described with reference to the accompanying drawings.

Figure 1:
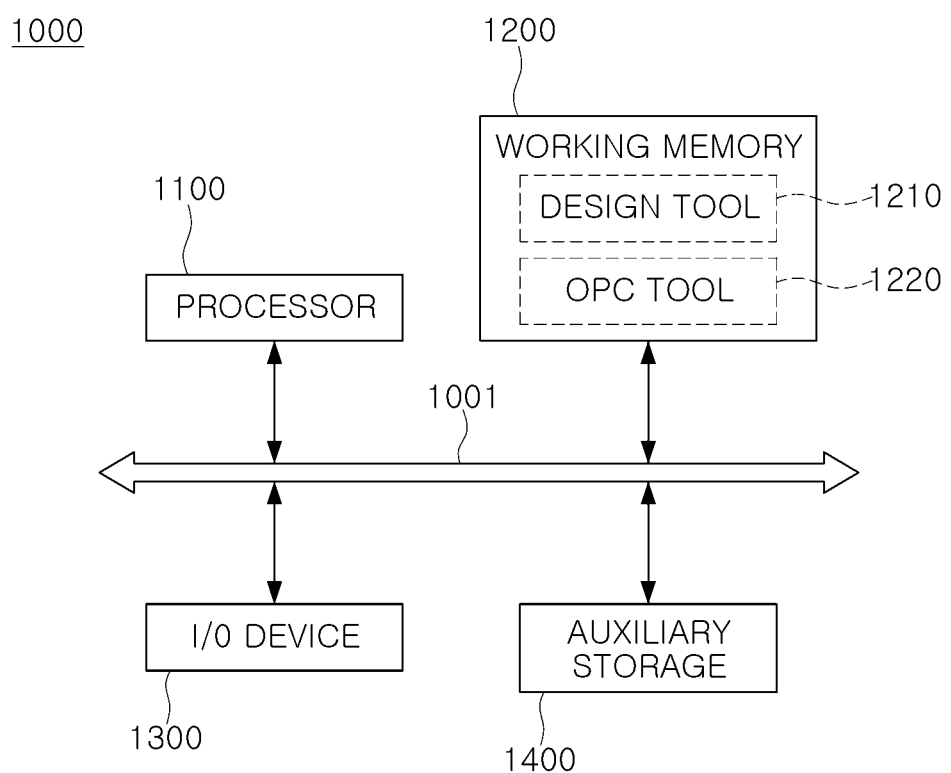
FIG. 1 is a block diagram illustrating a computing system 1000 performing an optical proximity correction (OPC) according to an embodiment of the present inventive concept.

FIG. 1 is a block diagram illustrating a computing system 1000 performing an optical proximity correction (OPC) according to an embodiment of the present inventive concept. Referring to FIG. 1, the computing system 1000 may include at least one processor 1100 connected to a system bus 1001, a memory device 1200, an input/output (I/O) device 1300, and an auxiliary storage 1400.

For example, the computing system 1000 may be provided as a dedicated device for a method of generating/correcting an OPC model or as a dedicated device for performing semiconductor design including the same. For example, the computing system 1000 may include various design and verification simulation programs. The processor 1100, the memory device 1200, the I/O device 1300, and the auxiliary storage 1400 may be electrically connected through the system bus 1001 and exchange data with each other. However, a configuration of the system bus 1001 is not limited to the above description, and may further include mediation units for efficient management.

As used herein, components described as being "electrically connected" are configured such that an electrical signal can be transferred from one component to the other (although such electrical signal may be attenuated in strength as it transferred and may be selectively transferred).

The processor 1100 may be implemented to execute at least one instruction. For example, the processor 1100 may be implemented to execute software (application programs, operating systems, device drivers) to be executed in the computing system 1000. The processor 1100 may execute an operating system that is loaded into the memory device 1200. The processor 1100 may execute various application programs to be driven based in the operating system. For example, the processor 1100 may be a central processing unit (CPU), a microprocessor, an application processor (AP), or any processing device similar thereto.

The memory device 1200 may be implemented to store at least one instruction. For example, the memory device 1200 may be loaded with an operating system or application programs. When the computing system 1000 is booted, an OS image stored in the auxiliary storage 1400 may be loaded to the memory device 1200 based on a booting sequence. General I/O operations of the computing system 1000 may be supported by the operating system. Similarly, application programs may be loaded to the memory device 1200 to be selected by a user or to provide a basic service. For example, as described above, a design tool 1210 for semiconductor design or an OPC tool 1220 for a layout pattern dividing method and an OPC method may be loaded from the auxiliary storage 1400 to the memory device 1200.

In addition, the memory device 1200 may be a volatile memory such as dynamic random access memory (DRAM), static random access memory (SRAM), etc., or a non-volatile memory such as a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The design tool 1210 may perform a function of changing the shapes and positions of specific layout patterns to be different from those defined by a design rule. Also, the design tool 1210 may perform a design rule check (DRC) in a changed bias data condition.

The OPC tool 1220 may perform an OPC function on a layout pattern. For example, the OPC tool 1220 may correct a rectangular pattern to any one of a plurality of OPC shapes depending on a condition.

In an embodiment, the OPC tool 1220 may select first targets from among the rectangular patterns to perform a first OPC on the first targets, and select second targets from among the selected first targets to perform a second OPC on the second targets. In an embodiment, the OPC tool 1220 may perform the first OPC on the first targets except for the second targets and perform the second OPC on the second targets. Here, the first OPC may be multi-edge OPC (ME-OPC), and the second OPC may be multi-edge corner rounding OPC (ME-CROPC). In an embodiment, the second targets may be selected using an image parameter or a mask rule check (MRC).

The I/O device 1300 may control user input and output from user interface devices. For example, the I/O device 1300 may include input units such as a keyboard, a keypad, a mouse, and a touch screen to receive information from a designer. Using the I/O device 1300, the designer may receive information on a semiconductor region or data paths that require adjusted operating characteristics. In addition, the I/O device 1300 may include an output units such as a printer or a display to display a processing process and results of the design tool 1210 or the OPC tool 1220.

The auxiliary storage 1400 may be provided as a storage medium of the computing system 1000. The auxiliary storage 1400 may store application programs, an OS image, and various data. The auxiliary storage 1400 is provided in the form of a mass storage device such as a memory card (MMC, eMMC, SD, Micro SD, etc.), hard disk drive (HDD), solid state drive (SSD), universal flash storage (UFS), etc.

In general, the OPC shape has a limitation of diffraction due to a reduction in pitch. For example, because pitches of patterns of semiconductor devices have been reduced by increased density of patterns in the semiconductor devices, diffractions of light in photolithography processes affect shapes of patterns more seriously in that optical interferences increase between neighboring patterns. In order to overcome this limitation, two or more masks may be used, but the process cost may increase by as much as the added mask. In addition, an inverse lithography technique (ILT) for single mask patterning may be used, but, in this case, isoproturon (IPU) may deteriorate due to a decrease in diffraction efficiency. This may cause pattern defects. Due to geometric limitation of general OPC, manufacturing of an additional mask and ILT introduction may be solutions. However, by the reasons described above, a new OPC method may be beneficial to reduce costs and secure mass productivity.

The computing device 1000 for performing new OPC according to an embodiment of the present inventive concept may select an ME-CROPC shape target from a layout and perform ME-CROPC on the selected target, thereby performing low-cost and highly efficient patterning, while using a single mask.

Figure 2:
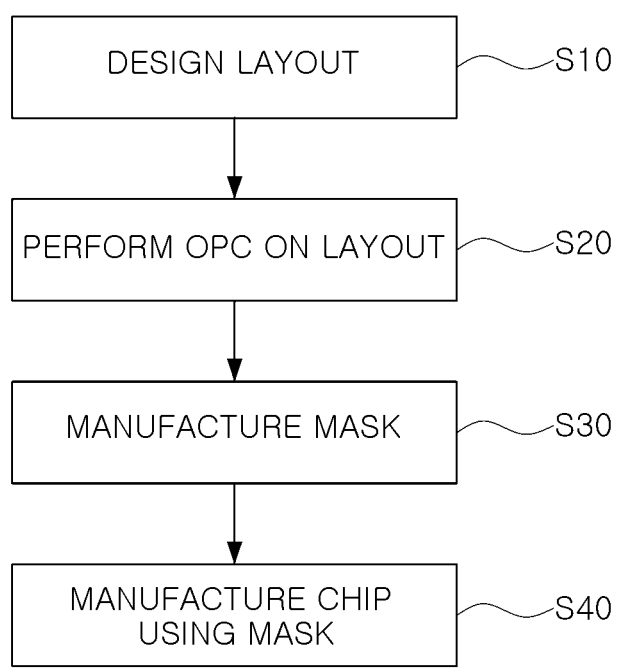
FIG. 2 is a flowchart illustrating a method of manufacturing a semiconductor chip/device according to an embodiment of the present inventive concept.

FIG. 2 is a flowchart illustrating a method of manufacturing a semiconductor chip/device according to an embodiment of the present inventive concept. Referring to FIG. 2, the method of manufacturing a semiconductor chip/device may include an operation (S10) of designing a design layout of a semiconductor chip, an operation (S20) of performing OPC and position correction on the design layout, an operation (S30) of manufacturing a mask using the corrected design layout, and an operation (S40) of manufacturing a semiconductor chip using the mask.

In the operation (S10) of designing a design layout of the semiconductor chip, a design layout corresponding to a circuit pattern of the semiconductor chip to be formed on a wafer may be provided from a host computer or server of a semiconductor manufacturing facility. For example, the layout is a physical indication for a circuit designed for a semiconductor chip to be transferred onto a wafer, and may include a plurality of patterns. For example, the design layout may be provided as coordinate values of a contour of patterns constituting the design layout from a computer aided design (CAD) system. For example, the patterns may include multiple patterns in which the same shape is iterated, and the patterns may be provided in a shape of a combination of polygons, e.g., including such as a triangle or a quadrangle.

In the operation (S20) of performing OPC and position correction on the design layout may include an OPC operation and a position correction operation performed as separate operations, respectively. First, the OPC is a process of correction by changing patterns included in a design layout by reflecting an error caused by the optical proximity effect (OPE). As patterns are getting fine/minute, an optical proximity phenomenon may occur/increase due to an influence between neighboring patterns during an exposure process. Therefore, by performing the OPC for correcting the design layout, the optical proximity effect may be reduced/suppressed by performing optical proximity correction to correct/improve the design layout. For example, the OPC may include expanding an overall size of patterns constituting the design layout and processing a corner portion. For example, OPC may include moving/shifting the corners of each pattern or adding additional polygons. By the OPC, a distortion phenomenon of a pattern due to diffraction and interference of light generated during exposure may be corrected and an error caused by a pattern density may be corrected. After the OPC operation, an OPC correction verification operation may be further performed.

The position correction may include moving/shifting a position of an optical-proximity-corrected pattern in consideration of physical deformation and change of a lower structure in which the patterns are to be aligned. Deformation of the lower structure occurs due to factors during the manufacturing process of the semiconductor chip/device, thereby causing progressive misalignment in which the actual pattern positions of the patterns of the lower structure are changed/different from the original layout. The position correction may be moving/changing only the position, without changing a shape of the optical-proximity-corrected pattern.

Final design layout data corrected by OPC and position correction may be transmitted to an exposure facility for the manufacture of masks for lithographic processes, such as photomasks and electron beam masks. The operation (S30) of manufacturing a mask using the corrected design layout may be an operation of manufacturing a mask according to the corrected design layout data. A mask may be manufactured by performing an exposure process on the substrate for a mask using the corrected design layout data. After the exposure process, for example, a mask may be formed by further performing a series of processes such as development, etching, cleaning, and baking. In an embodiment, before transmitting the corrected design layout data, a verification operation for the corrected design layout data may be further performed.

The operation (S40) of manufacturing a semiconductor chip using a mask may include performing a lithography process using a mask. The semiconductor chip may include or may be a volatile memory such as a dynamic random access memory (DRAM), a static random access memory (SRAM), or the like, or a nonvolatile memory such as a flash memory, and/or may include or may be a logic semiconductor device, such as a micro-processor, for example, a central processing unit (CPU), a controller, or an application specific integrated circuit (ASIC). For example, the semiconductor chip may be manufactured by performing a process of forming second iterated patterns on the lower structure including the first iterated patterns. The second iterated patterns may be formed by being aligned with the first iterated patterns with high accuracy by a mask. The semiconductor chip may be finally manufactured by further performing a deposition process, an etching process, an ion process, a cleaning process, etc. in addition to the lithography process.

In general, the OPC method may be a method of suppressing an occurrence of an optical proximity effect (OPE) by correcting a layout of a pattern to thereby overcome the OPE that occurs during an exposure process due to an influence between neighboring patterns as patterns are miniaturized. This OPC method is largely divided into two types: one is a rule-based OPC method, and the other is a simulation-based or model-based OPC method. The OPC method of the present inventive concept may be, for example, a model-based OPC method. The model-based OPC method may be advantageous in terms of time and cost because it uses only measurement results of representative patterns, without the necessity to measure all of a large number of test patterns.

Thereafter, a contour of a target pattern is predicted through simulation by inputting mask data into the OPC model. The OPC model is a simulation model for predicting the contour of the target pattern, and various basic data may be input to the OPC model as input data. Here, the basic data may include mask data for a fragment. In addition, the basic data may include information data such as thickness, refractive index, and dielectric constant of a photo resist (PR), and may include data of a source map for a shape of an illumination system. Of course, the basic data is not limited to the above described examples. The mask data may include not only fragment data, but also data such as shapes of patterns, positions of patterns, types of measurements (measurements for space or lines) of patterns, and basic measurement values.

Figure 3:
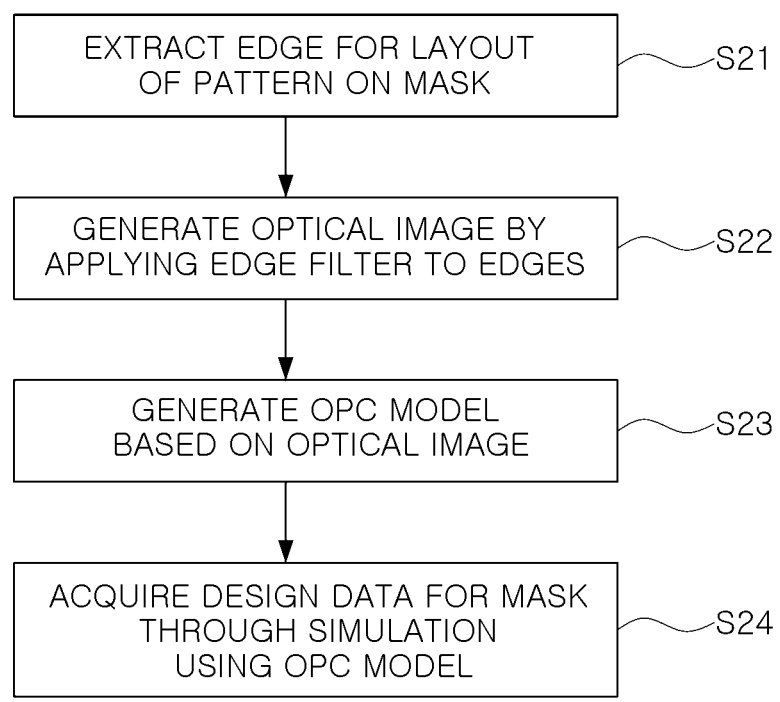
FIG. 3 is a flowchart illustrating an OPC method illustrated in FIG. 2.

FIG. 3 is a flowchart illustrating the OPC method illustrated in FIG. 2.

Referring to FIG. 3, in the OPC method according to the present embodiment, first, edges for a layout of a pattern on a mask are extracted (S21). Here, the pattern on the mask may be a pattern which may be transferred onto a substrate such as a wafer through an exposure process to form a target pattern on the substrate. In general, a shape of the target pattern on the substrate may be different from a shape of the pattern on the mask in terms of the characteristics of the exposure process. Also, since the pattern on the mask is reduced-projected and transferred onto the substrate, the pattern on the mask may have a larger size than the target pattern on the substrate.

The layout of the pattern on the mask may have a 1D or 2D shape. Here, the 1D shape may not refer to a line without an area, but may refer to a shape extending in one direction, such as a line & space pattern. For example, the 1D shape may be a shape of pattern extending in a direction. The 2D shape may be a shape of pattern extending two dimensionally, e.g., in a plan view. Edges may correspond to lines surrounding an outer area/edge of the layout of the pattern. According to an embodiment, the edges may correspond to lines surrounding a space between layouts of a pattern. In certain embodiments, the edges may correspond to both lines surrounding an outer portion of the layout of the pattern and lines surrounding the space.

Next, an optical image is generated by applying an edge filter to the extracted edges (S22). Here, the optical image may be a mask near field image calculated on a rear surface of the mask immediately after light has passed through the mask. The edge filter is a filter capable of generating an optical image of a portion corresponding to the edges, and the value of the edge filter may vary according to the positions and characteristics of the edges. By applying an edge filter corresponding to each of the edges, an optical image corresponding to each of the edges may be generated.

Figure 4A:
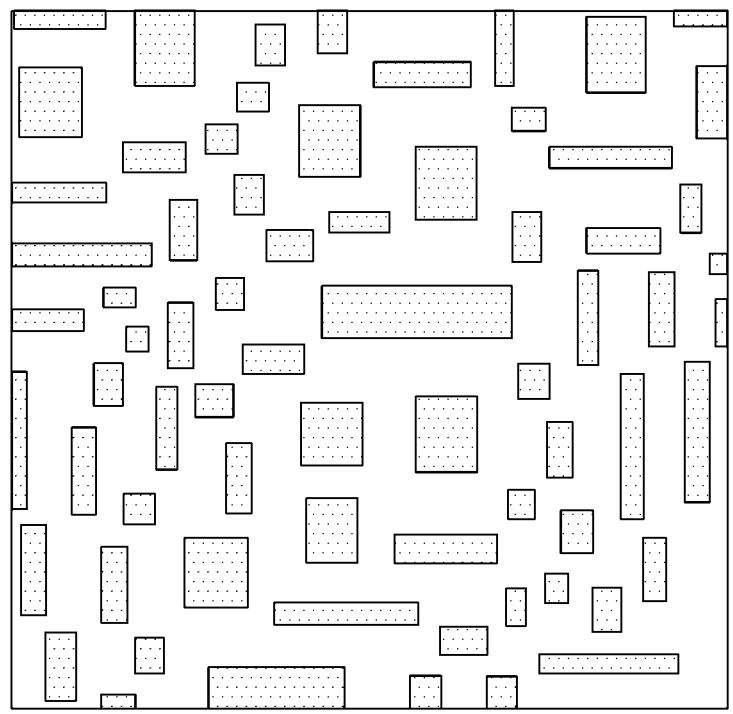
FIG. 4A is a view illustrating a shape of a pattern on a general mask.
Figure 4B:
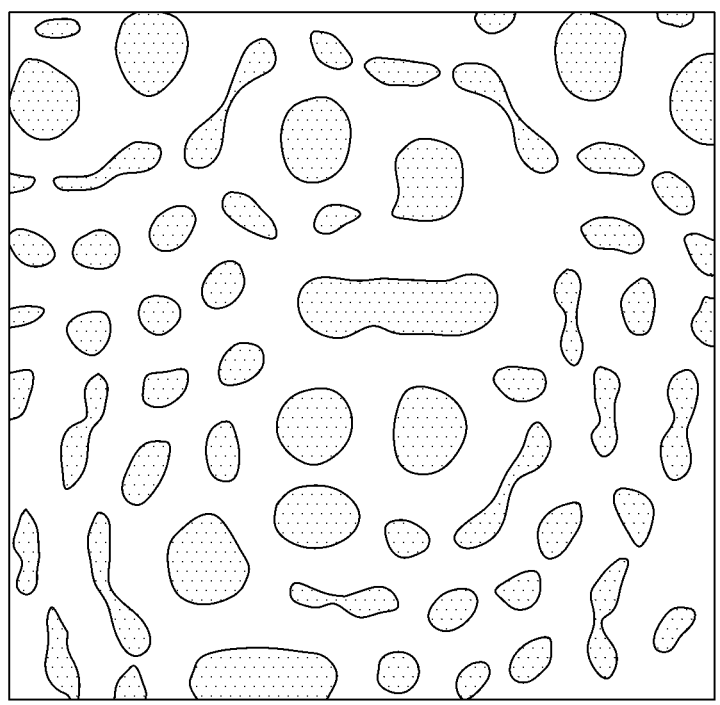
FIG. 4B is a view illustrating a curve (curvilinear) of a pattern on a mask according to an embodiment of the present inventive concept.

The generating of the optical image for the pattern on the mask will be described in detail hereinafter. In order to overcome the recent patterning limitation and secure a process margin, the shapes of the patterns on the masks expend from an orthogonal shape as shown in FIG. 4A to include curvilinear shapes as shown in FIG. 4B. In addition, research on the OPC method for such curvilinear patterns has been actively conducted. In general, the pattern on the mask may have a thickness, e.g., in a vertical direction, that cannot be neglectable compared to an exposure wavelength. Accordingly, for precise OPC, it is beneficial to calculate an optical image in consideration of a mask topography effect, e.g., a mask 3D effect. In order to perform OPC on a large-area mask, calculation of an optical image should be performed fast thereby completing the OPC over the whole large-area mask within a short time, e.g. for cost effectiveness purposes. Therefore, it may not be appropriate/beneficial to use a rigorous simulation method that takes a lot of time to calculate the optical image. Here, the rigorous simulation method may be, for example, an electromagnetic field simulation method such as rigorous coupled-wave analysis (RCWA) or finite difference time domain (FDTD) simulation. In the case of such a rigorous simulation method, a mask near-field image accurately reflecting the shape of the pattern on the mask may be obtained. However, the present invention does not exclude the rigorous simulation method. For example, as the technology develops, the rigorous simulation method may be also adapted for the present invention.

Accordingly, an optical image of the mask is calculated using a compact simulation model, and the most commonly used method is a domain decomposition method (DDM). The DDM is a method of dividing a pattern on a mask into domains and obtaining an optical image of each domain using edge filter approximation.

For example, the DDM is a method of storing edge filter values calculated for each width/space of a pattern through FDTD simulation in advance in a filter library and retrieving an edge filter value corresponding to each edge from the filter library to use it to calculate an optical image for each pattern, thereby calculating an optical image that is almost similar to an optical image calculated through rigorous simulation.

Therefore, the DDM may generate an optical image that effectively corrects the 3D effect of the mask. Here, the optical image using edge filter approximation may include a first optical image based on thin mask approximation (TMA) and a second optical image using an edge filter. For example, a final optical image of the corresponding pattern may be generated by combining the first optical image and the second optical image. For reference, the TMA may be the Kirchhoff approximation and/or may be a near field image calculated on an assumption that a thickness of the mask is as thin as being almost nonexistent, e.g., negligible quantity of thickness, and a perforated portion, e.g., open/transparent area, allows light to completely pass therethrough and a blocked portion completely blocks light. For example, the light blocking portion of the mask patterns may be considered to be perfectly opaque in the TMA.

The OPC method may generate an optical image by applying an any-angle filter corresponding to a portion of an edge of a curve, and thus may generate an optical image in which the mask 3D effect is effectively corrected. By generating an OPC model based on the optical image and performing a simulation using the OPC model, optimal design data for the mask may be acquired. Furthermore, the OPC method of the present embodiment enables a reliable high-quality mask to be manufactured based on the optimal design data for the mask obtained using the OPC method, thereby significantly contributing to improvement of performance and reliability of a product by using the mask for patterning of the product ultimately.

The OPC method according to an embodiment of the present inventive concept may perform a plurality of different OPCs. A plurality of OPC shapes corresponding to a rectangular pattern may exist according to performing a plurality of OPCs. In an embodiment, the plurality of OPC shapes may include an MEOPC shape and an ME-CROPC shape. In an embodiment, performing OPC may include selecting a ME-CROPC shape target from a layout and performing ME-CROPC on the selected target. In an embodiment, the target of the ME-CROPC shape may be selected using at least one image parameter and a mask rule check (MRC). Here, the at least one image parameter may include a normalized image log slope (NILS) or a mask error enhancement factor (MEEF).

After the optical image is generated, an OPC model is generated based on the optical image (S23). After the optical OPC model is generated, an OPC model for the PR is generated. The generating of an OPC model for PR may include optimization of a threshold for PR. Here, the threshold of the PR may be a threshold at which a chemical change occurs in the layer of the PR during an exposure process, and for example, the threshold may be given as an intensity of exposure light. Generating of an OPC model for PR may also include selecting an appropriate model form from several PR model forms. The optical OPC model and the OPC model for PR are collectively referred to as an OPC model. Therefore, a combination of both a process of generating the optical OPC model and a process of generating the OPC model for PR may be called a process of generating an OPC model, e.g., an OPC modeling process. Hereinafter, the term OPC model is used as a concept of combination of the optical OPC model and the OPC model for PR.

Thereafter, design data for the mask is acquired through simulation using the OPC model (S24). After the OPC model is generated, the OPC model is verified. The verification of the OPC model may be performed through root mean square (RMS) calculation for CD error, edge placement error (EPE) check, and the like. When the OPC model is included in set/existing specifications, e.g., as a new OPC model, the OPC model verification may be completed and the corresponding OPC model may be selected as an OPC model for simulation. If the OPC model is not included in the set (e.g., previously confirmed) specifications, the process of generating the OPC model, e.g., the process of generating the optical OPC model or the OPC model for PR is performed again, e.g., to verify the OPC model, e.g., by modifying the OPC model.

After the OPC model is verified, simulation is performed using the corresponding OPC model. Design data of a mask close to an actual measurement may be obtained through simulation using the OPC model. The design data of the mask obtained through the simulation may be transmitted to a mask manufacturing team as mask tape-out (MTO) design data for later mask manufacturing.

As described above, the process of generating an optical image, generating an OPC model, and acquiring design data is called as an OPC method. The OPC method according to an embodiment of the present inventive concept may have a plurality of OPC shapes with respect to a rectangular pattern.

FIGS. 5A, 5B, 5C, and 5D are views illustrating OPC shapes according to an embodiment of the present inventive concept. Here, the dotted line indicates a target pattern, the solid line indicates a multi-edge, a dot indicates a multi-control point, and a hatched portion indicates a final OPC.

Figure 5A:
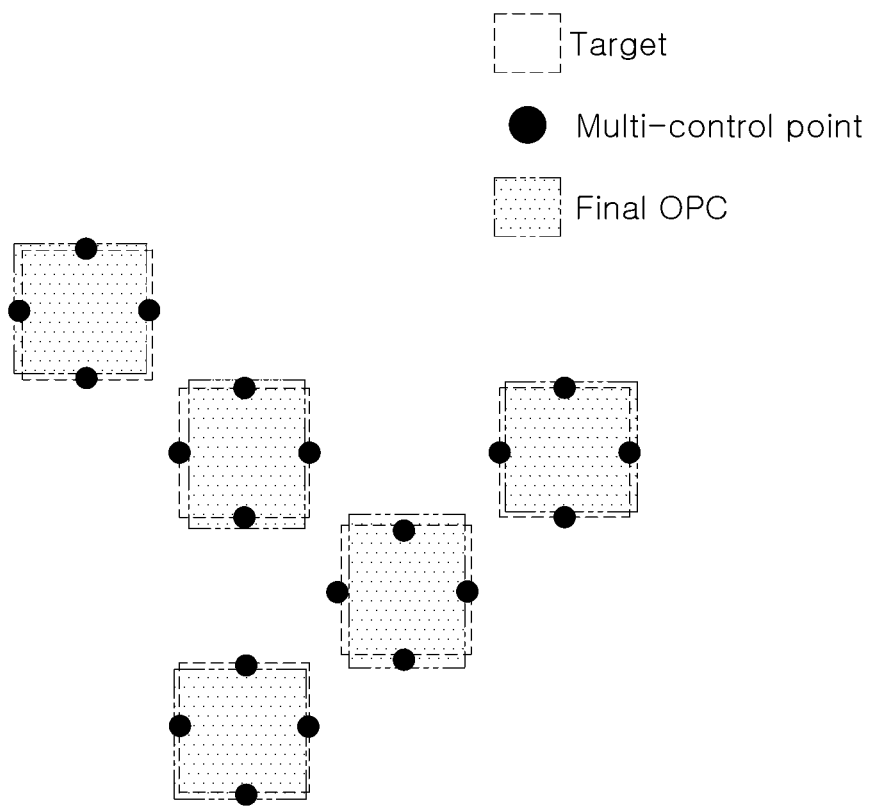
FIGS. 5A, 5B, 5C, and 5D are views illustrating an OPC shape according to an embodiment of the present inventive concept.
Figure 5B:
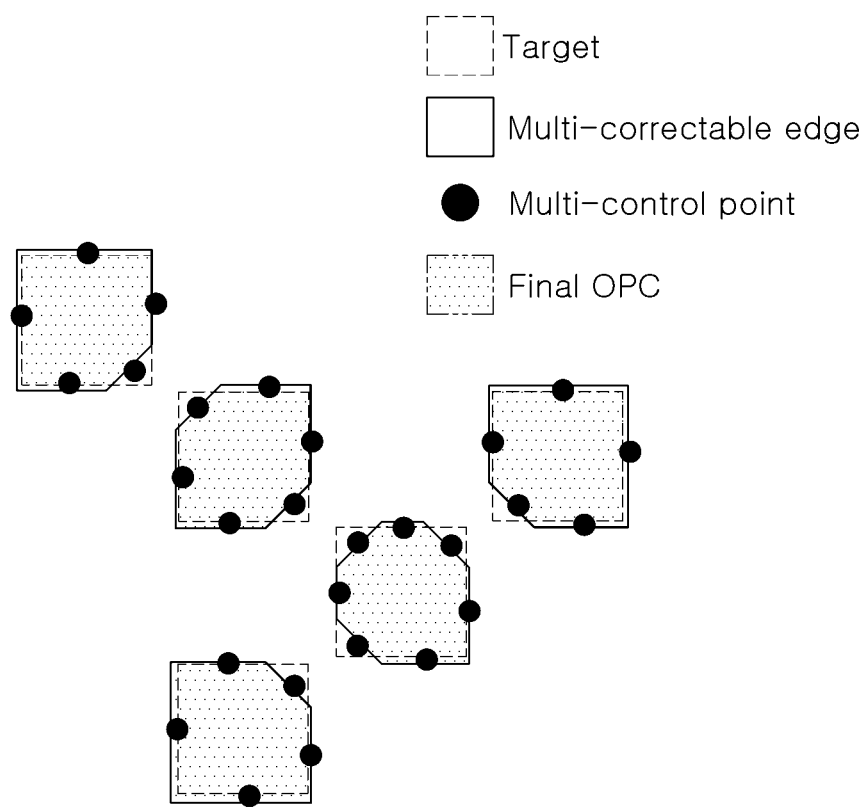
Figure 5C:
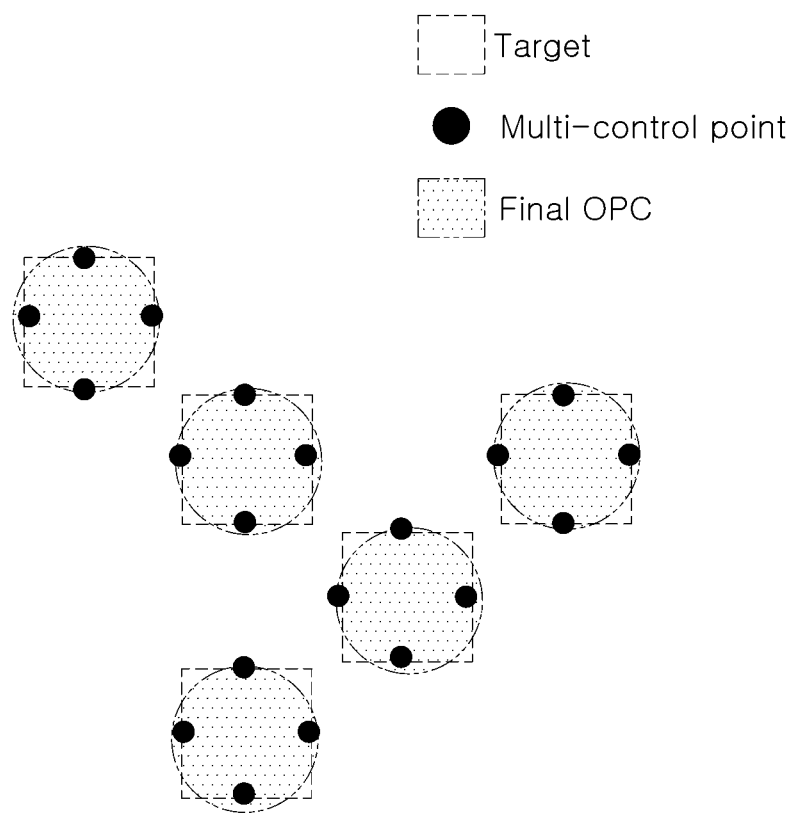
Figure 5D:
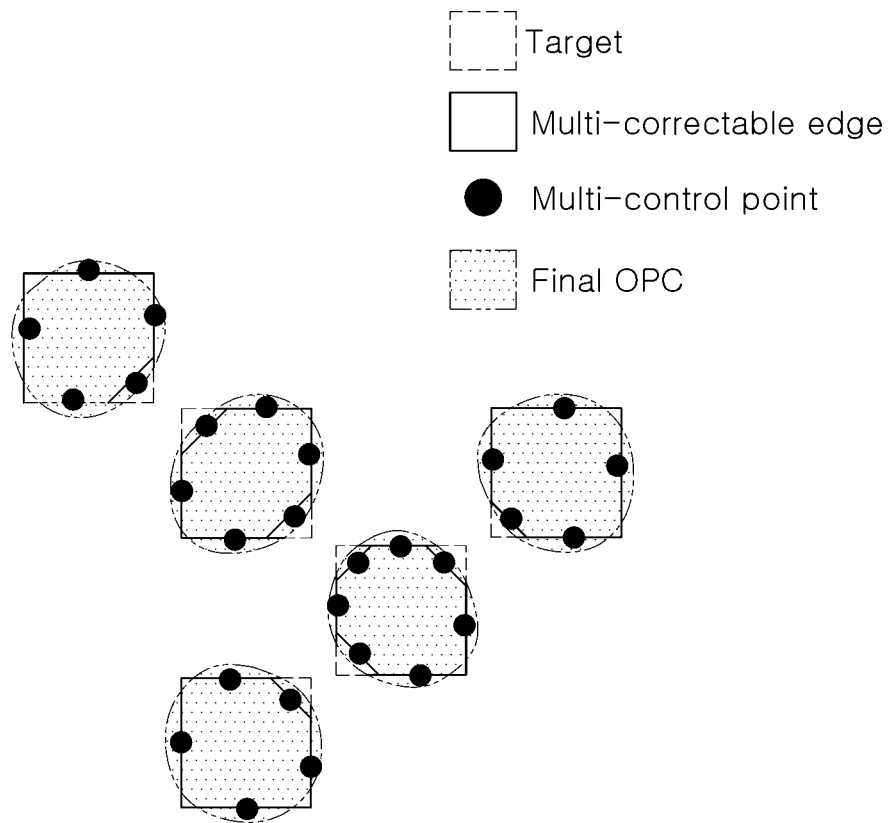

Referring to FIG. 5A, typical OPC shapes have multi-control points at respective edge lines. Referring to FIG. 5B, multi-edge (ME) OPC shapes have one to three cut surfaces and have multi-control points at respective edge lines. Referring to FIG. 5C, corner rounding (CR) OPC shapes have a multi-control point at a point or its vicinity in which a target pattern meets a final OPC shape. Referring to FIG. 5D, ME-CROPC shapes are obtained by curvilinear processing portions between multi-control points in the MEOPC shapes illustrated in FIG. 5B.

Figure 6:
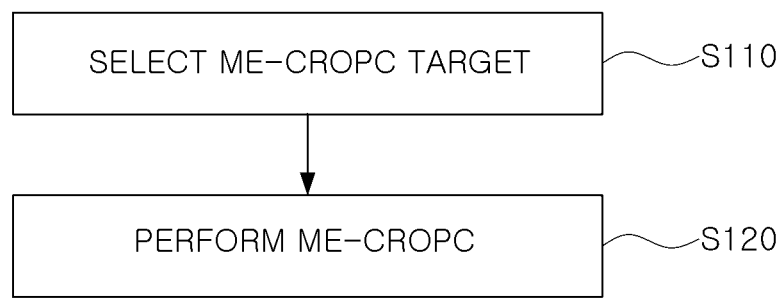
FIG. 6 is a flowchart illustrating an OPC method according to an embodiment of the present inventive concept.

FIG. 6 is a flowchart illustrating an OPC method according to an embodiment of the present inventive concept. Referring to FIG. 6, the OPC method may be performed as follows. An MR-CROPC target may be selected from a layout pattern (S110). When ME-CROPC is applied to all patterns in a full chip, a runtime is long and a central processing unit (CPU) capacity is significantly increased, e.g., a high capacity CPU may be needed. Therefore, only the target pattern may be defined and applied for fast and efficient OPC.

In the case of contact/via, as a center to center (C2C) pitch decreases, OPC convergence is insufficient due to C2C limitations/restrictions during mask rule check (MRC) or NILS/MEEF may be deteriorated. Due to this deterioration, poor dispersion and/or distortion may occur, and short/missing margins may be insufficient. Therefore, for such pattern searching, a pattern search algorithm using image parameters (e.g., NILS/MEEF) and MRC may be applied. Here, on the assumption that NILS is N, MEEF is M, and MRC C2C is C, a target may be determined based on each spec x, y, and z with mass productivity based on design rule as follows. A MR-CROPC target may be determined by the following equation.

$$S(N,M,C)=\text{if}(N<x, M>y, C<z) \qquad \text{[Equation 1]}$$

For example, patterns with small NILS, large MEEF, and MRC C2C less than a specific value are defined as a hot spot and selected as a ME-CROPC target.

MR-CROPC may be performed on the selected MR-CROPC target (S120). Multi-edge capable of moving (e.g., movable edges) may be generated by cutting the corner of the target diagonally to perform ME-CROPC on the pattern selected by a pattern search algorithm. In the case of rectangle, correction is performed with 4 edges, but in the case of creating multi-edges, up to 8 multi-edges may be generated depending on the pattern environment (e.g., neighboring patterns). Control points may be added to an upper portion of each edge. EPE (Contour-Target) may be calculated so that a difference of the contour compared to the target at each point is small/minimized. Here, the contour may be generated by performing simulation with the OPC shape with rounding applied as much as a radius value set at all angles. By iterating the process for a set/predetermined number of iterations, a final OPC output may be determined in a curvilinear OPC shape that minimizes EPE. Accordingly, the final OPC result may secure the diffraction efficiency as much as possible or sufficiently by improving the slope of the multi-edge, while keeping the limited mask manufacturing standards.

Figure 7:
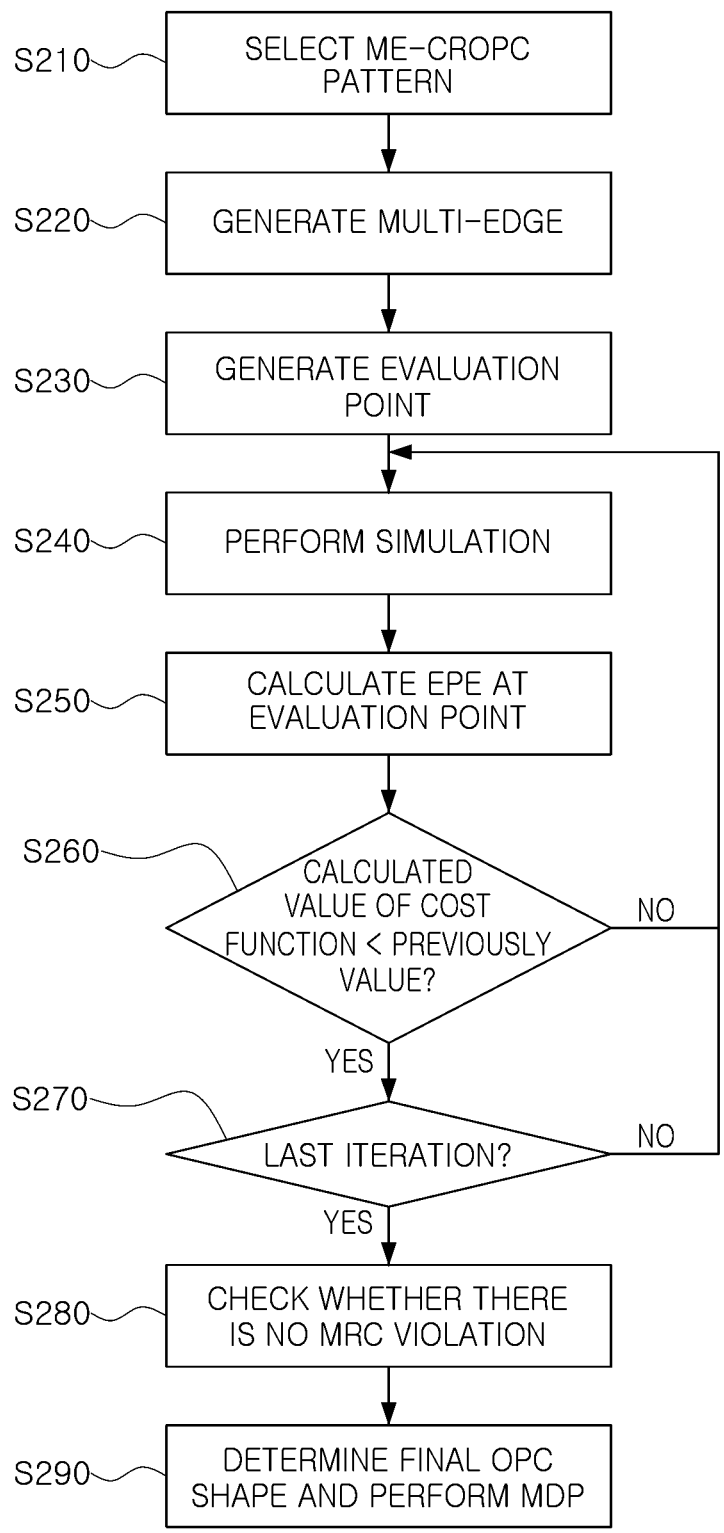
FIG. 7 is a flowchart illustrating an example of an OPC method according to an embodiment of the present inventive concept.

FIG. 7 is a flowchart illustrating an example of an OPC method according to an embodiment of the present inventive concept.

Referring to FIG. 7, the OPC method may be performed as follows. A rectangular layout pattern for ME-CRCOPC target selection may be selected (S210). Multi-edges may be generated by corner chopping of the selected rectangular shape (S220). An evaluation point may be generated on each multi-edge (S230). After OPC is performed, a simulation may be performed by rounding at each angle (S240). Thereafter, the EPE may be calculated at the evaluation point (S250). It may be determined whether a calculated value of the cost function is smaller than a previous calculated value (S260). If the calculated value of the cost function is not smaller than that of the previous value, operation S240 may be performed. Instead, if the calculated value of the cost function is smaller than a previous value, it may be determined whether the number of iterations is the last (S270). If the number of iterations is not the last, operation S240 may be performed. Instead, if the number of iterations is the last, it may be checked whether there is no MRC violation (S280). The final OPC shape may be determined and MDP may be performed (S290).

In an embodiment, the number of multi-edges corresponding to the rectangular pattern selected as the ME-CROPC target may be 5 to 8. In an embodiment, when a simulation is performed, a radius value for each angle may be set and rounding may be performed using the set radius value.

Figure 8A:
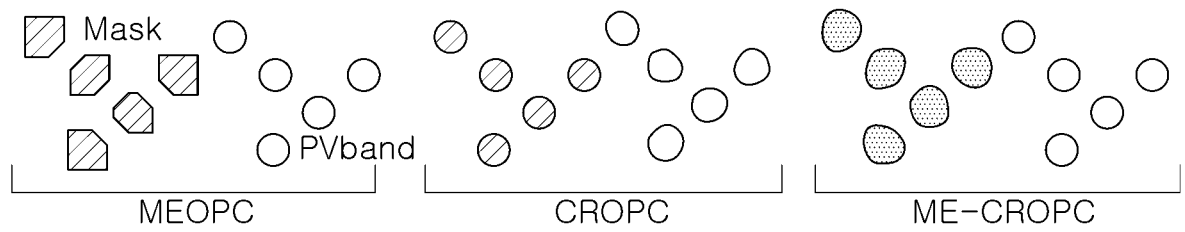
FIGS. 8A and 8B are views showing comparison of OPC simulation results related to a first point.
Figure 8B:
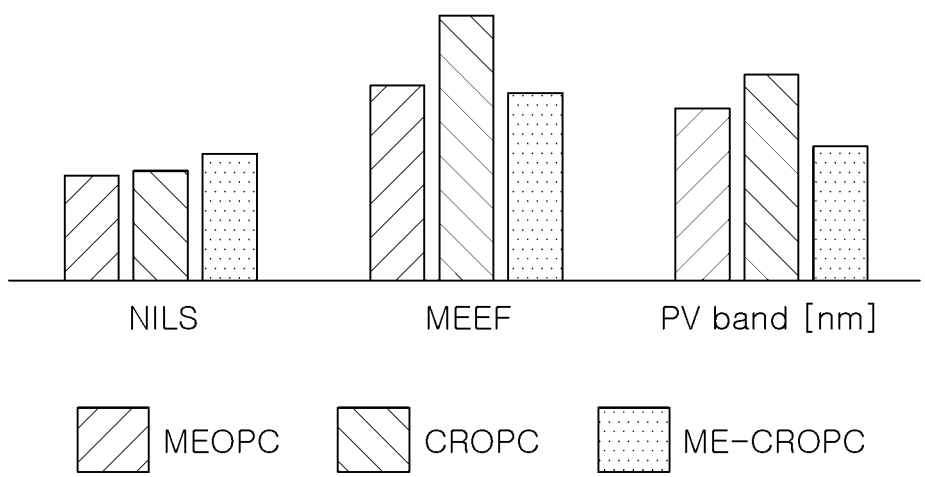

FIGS. 8A and 8B are views illustrating a comparison of OPC simulation results related to a first point. The NILS indicators are higher in the order of ME-CROPC, CROPC, and MEOPC. MEEF indicators are lower in the order of ME-CROPC, MEOPC, and CROPC. The PV bands are narrower in the order of ME-CROPC, MEOPC, and CROPC.

Figure 9A:
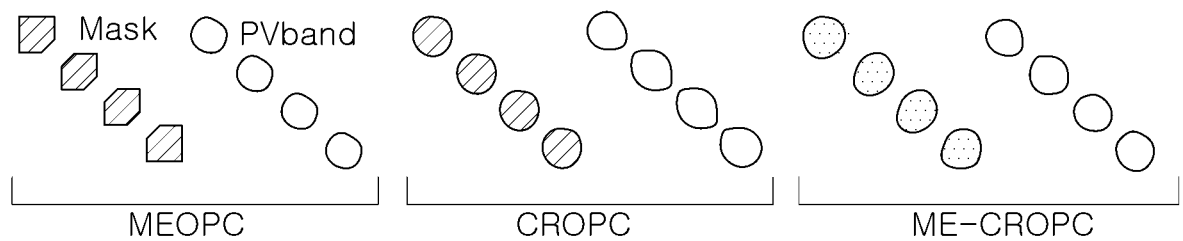
FIGS. 9A and 9B are views showing comparison of OPC simulation results related to a second point.
Figure 9B:
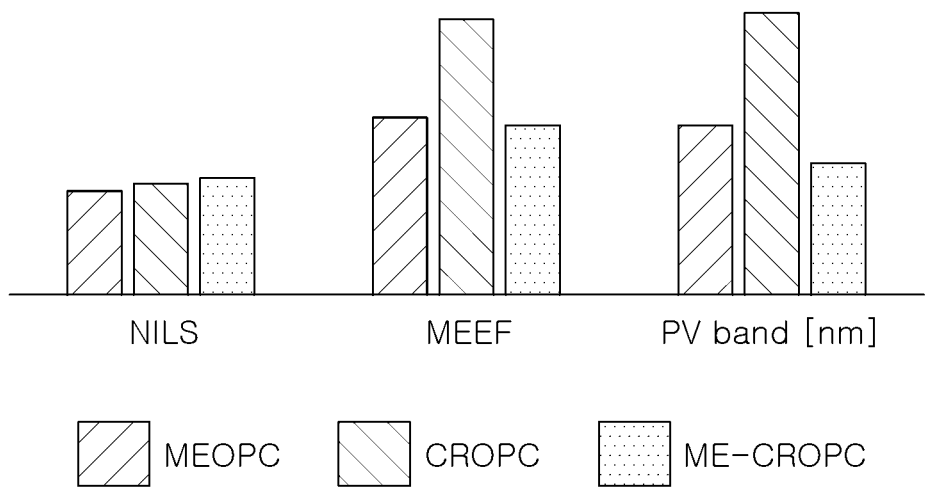

FIGS. 9A and 9B are views illustrating a comparison of OPC simulation results related to the second point. The NILS indicators are higher in the order of ME-CROPC, CROPC, and MEOPC. MEEF indicators are lower in the order of ME-CROPC, MEOPC, and CROPC. The PV bands are narrower in the order of ME-CROPC, MEOPC, and CROPC.

Referring to FIGS. 8B and 9B, it can be that the image parameters (NILS/MEEF) and process variation (PV band) are improved in ME-CROPC, in which diffraction efficiency is maximized, compared to MEOPC and CROPC, which are MRC relaxation solutions.

In the OPC method according to an embodiment of the present inventive concept, after first generating a model for predicting CD data based on the center of the slit, apodization tables indicating the intensity for each slit position that is actually occurring in a wafer may be applied to the OPC model. Thereafter, in the OPC method of the present inventive concept, the intensity is corrected for each slit position through the corresponding apodization table.

Figure 10:
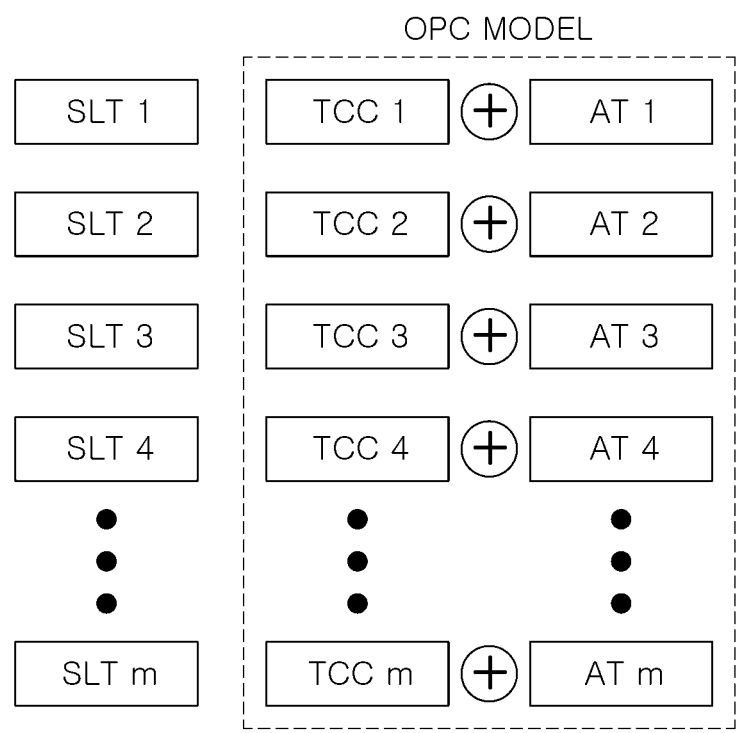
FIG. 10 is a view conceptually illustrating a process of generating an OPC model according to an embodiment of the present inventive concept.

FIG. 10 is a diagram conceptually illustrating a process of generating an OPC model according to an embodiment of the present inventive concept. Referring to FIG. 10, for the slits SLT1 to SLTm (m is an integer of 2 or greater), an OPC model may be produced using apodization tables (AT1 to ATm) corresponding to TCC (TCC1 to TCCm). In an embodiment, the TCC may be a transfer function that calculates kernels used in an OPC method. The TCC may include information on a light source and a pupil.

The apodization tables AT1 to ATm may include apodization values according to positions of the slits. In an embodiment, the apodization values may be values measured for each slit position according to equipment. In another embodiment, the apodization values may be values of a trend graph using values measured for each slit position.

In general, as patterns are miniaturized, optical proximity effects (OPE) due to influences between neighboring patterns increase/occur during the exposure process. The OPC method may suppress/reduce the occurrence of OPE by correcting a pattern layout on a mask that transfers the pattern, e.g., during the exposure process and/or ensuing additional processes.

Figure 11:
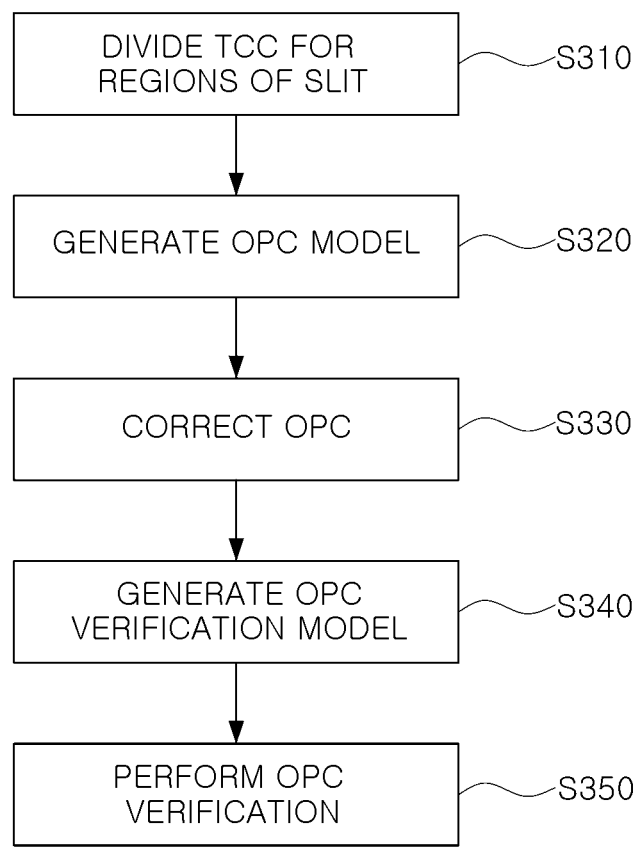
FIG. 11 is a flowchart illustrating an OPC method according to another embodiment of the present inventive concept.

FIG. 11 is a flowchart illustrating an OPC method according to another embodiment of the present inventive concept. Referring to FIGS. 10 and 11, the OPC method may include a method of correcting a pattern layout on a mask used in an EUV exposure process.

A transmission cross coefficient (TCC) may be divided for each slit region (S310). Since the EUV exposure process uses a wavelength of less than 22 nm, for example, a short wavelength of 13.5 nm, the diffraction phenomenon is not large. Accordingly, compared to OPC in the conventional DUV exposure process using 193 nm, the proportion of OPC to the diffraction phenomenon may not be large. On the other hand, the EUV exposure process may cause a flare effect due to defects such as a mirror or a shadowing effect caused by a thickness of a mask pattern. An OPC method that reflects such a flare effect or shadowing effect is beneficial for the EUV exposure process. In general, the flare effect is caused by scattering of light depending on surface roughness of a mirror. The flare effect may be more pronounced in EUV with shorter wavelengths because scattering is inversely proportional to the square of the wavelength. In the EUV exposure process, the following problems may be caused in relation to light being incident at 6° from the normal. For example, in the DUV exposure process, the slit has a rectangular structure, but in the EUV exposure process, the slit may have a circular arc structure having a predetermined curvature. When the light incident at 6° from the normal passes through the curved slit of the arc structure, an azimuth angle thereof may vary depending on the position of the slit. Accordingly, the intensity and phases of the light passing through the slit may vary depending on the position of the slit. This may cause a CD issue/error. The occurrence of the CD error/issue depending on the position of the slit may cause an error in the TCC, and thus may cause an error in the OPC method or an OPC model accordingly.

Conventionally, since the slit used in the DUV exposure process has a rectangular, linear structure, there is no change in the azimuth angle of the light passing through the slit, and aberration depending on the position of the slit may rarely occur. Therefore, there is no problem even if the OPC is performed by calculating only the TCC of the central region of the slit and reflecting the same TCC in the entire region. However, in the case of the EUV exposure process, since a curved slit having an arc structure is used, the TCC varies depending on the position of the slit. When the OPC method is performed by calculating the TCC of only the central region of the slit as in the conventional DUV exposure process, an accurate OPC model may not be generated. Such an inaccurate OPC model may cause a defect in the pattern of the EUV mask and thus a large number of defective chips, thereby lowering the yield of the entire semiconductor device/chip manufacturing process.

In the EUV exposure process, when OPC is performed using only the central TCC despite the curved slit shape, an error may occur in an EUV mask pattern in a portion corresponding to an edge of the slit and in a chip corresponding thereto. An error caused by the slit structure is called a slit error or a scanner error. Accordingly, in the OPC method, the TCC may be calculated by dividing the TCC for each area of the slit rather than calculating the TCC only at the center of the slit.

A profile of a mask pattern may be determined by a contour of a profile function. The profile function may be expressed by the convolutional integral of an image intensity and the Gaussian function. As a result, by calculating the image intensity by calculating the kernels of the TCC, an OPC model for the mask pattern profile may be generated. Dividing the TCC may include a process calculating the TCC for each region of the slit by dividing the slit into regions. In an embodiment, the TCC may be divided using at least one of an aberration, a phase, an intensity, a polarity, and an apodization value depending on the coordinates of the slit.

After TCC dividing for each slit region, an OPC model may be generated by reflecting the divided TCC (S320). The TCC for each region of the slit is reflected in each region of the slit to generate OPC models for each region of the slit. Since the CD exists according to the position of the slit, the TCC for each region of the slit may vary. Accordingly, the OPC models of each region of the slit may also be different.

After generating the OPC model, OPC may be performed (S330). Here, the OPC performing operation may be performed by the OPC method described above with reference to FIGS. 1 to 9. In an embodiment, after generating an OPC model reflecting each TCC, a mask pattern is obtained through a simulation based on the OPC model, and the obtained mask pattern is compared with the target mask pattern. If there is a difference therebetween, the OPC may be corrected to fit the target mask pattern. For example, the target mask pattern may be a square, the OPC model may be generated as a square, but the mask pattern obtained through simulation may come out in a circular shape. In such a case, a correction may be made to add a shape to each corner of the OPC model of a square. Here, the OPC correction may be a concept of correcting the program so that a required model shape is obtained by reflecting overall parameters such as OPC recipe, model calibration, and horizontal and vertical bias, rather than a concept of simply correcting the model shape.

For example, in the present inventive concept, OPC correction corresponding to each of the slits SLT1 to SLTm may be performed using the apodization tables AT1 to ATM. After correcting the OPC, an OPC verification model may be generated (S340). The OPC verification model may eventually be a result of correcting the OPC. After generating the OPC verification model, OPC verification may be performed (S350). OPC verification may perform a simulation based on the OPC verification model. Such OPC verification may include a process of checking whether a mask pattern obtained through the simulation matches a target mask pattern.

In general, OPC verification may be a verification whether OPC correction has been properly performed through a simulation contour of a pattern. For example, when the simulation contour through the OPC verification model is within an error tolerance, the OPC method may be terminated/completed, and a mask tape-out (MTO) operation may be performed. If the simulation contour through OPC verification is out of the error tolerance, OPC is re-corrected through parameter correction such as model adjustment, OPC recipe, and bias, and OPC verification is performed again by creating an OPC verification model. The MOT may include requesting mask production by handing over the mask design data for which the OPC method is completed. Accordingly, the mask design data on which the OPC method is completed may be referred to as MTO design data.

In the OPC method according to the embodiment, the TCC may be divided for each slit region, an OPC model may be generated by reflecting the divided TCC, and OPC correction is performed according to the apodization value, thereby manufacturing an EUV mask correcting a pattern error of a portion corresponding to a slit edge caused by a slit effect. In addition, as the exposure process is performed through the EUV mask, defects of chips in the portion corresponding to the slit edge may be prevented/reduced. A dispersion in the EUV exposure process may be improved and the yield may be significantly improved.

Figure 12:
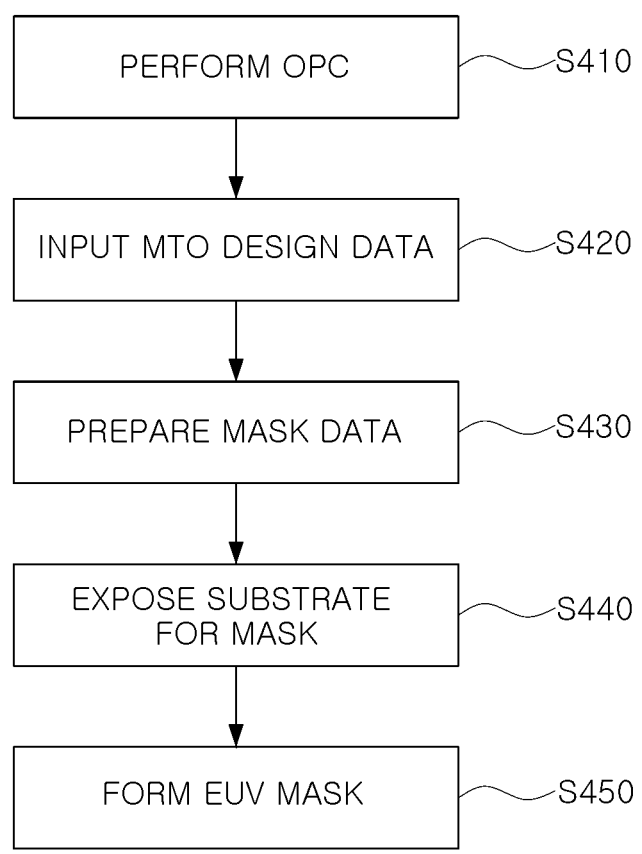
FIG. 12 is a flowchart illustrating a process of a method of manufacturing an extreme ultraviolet (EUV) mask according to an embodiment of the present inventive concept.

FIG. 12 is a flowchart illustrating a process of a method of manufacturing an EUV mask according to an embodiment of the present inventive concept. Referring to FIG. 12, OPC is performed (S410). Here, the TCC may be divided for each region of the slit, an OPC model may be generated by reflecting the divided TCC, and OPC may be performed based on an apodization table and the OPC model. Thereafter, a series of processes such as OPC verification may be additionally performed by generating an OPC verification model.

Performing the OPC of the present inventive concept may include selecting first targets on which to perform a first OPC from among rectangular patterns, selecting second targets on which to perform a second OPC from among the first targets, performing the first OPC on the first targets excluding the second targets, and performing the second OPC on the second targets. Here, the first OPC may be multi-edge OPC (MEOPC), and the second OPC may be multi-edge corner rounding OPC (ME-CROPC).

In an embodiment, the second targets may be selected using an image parameter or a mask rule check (MRC). In an embodiment, a transmission cross coefficient (TCC) may be divided for each slit area. In an embodiment, an apodization value indicating beam intensity for each slit position may be set.

As described above, after performing OPC, MTO design data is input (S420). In general, the MTO may include requesting mask manufacturing by handing over mask design data on which the OPC operation has been completed. Accordingly, the MTO design data may be considered as mask design data on which the OPC operation has been completed. The MTO design data may have a graphic data format used in electronic design automation (EDA) software or the like. For example, the MTO design data may have a data format such as graphic data system (GDS2), open artwork system interchange standard (ASIS), or the like.

After receiving the MTO design data, mask data preparation (MDP) is performed (S430). Mask data preparation may include, for example, format conversion known as fracturing, augmentation of barcodes for mechanical reading, standard mask patterns for inspection, job decks, etc., and verification of automatic and manual methods. Here, the job-deck may include creating a text file related to a series of instructions, such as arrangement information of multiple mask files, a reference dose, and an exposure speed or method.

The format conversion, e.g., fracturing, may include a process of dividing the MTO design data for each region and changing to a format for an electron beam exposure machine. For example, fracturing may include data operation such as scaling, data sizing, data rotation, pattern reflection, and color inversion. In the conversion process through fracturing, data for numerous systematic errors that may occur during the transfer process from design data to an image on a wafer may be corrected. A data correction process for these systematic errors is called mask process correction (MPC). For example, the data correction process may include adjusting a line width and increasing precision of pattern arrangement, called CD adjustment. In addition, it may be a process performed in advance for mask process correction. Here, systematic errors may be caused by distortion occurring in an exposure process, a mask development, etching process, and a wafer imaging process.

The mask data preparation may include the aforementioned MPC. MPC refers to a process of correcting an error occurring during an exposure process, e.g., a systematic error. Here, the exposure process may be a concept in which the MPC process generally includes electron beam writing, developing, etching, and baking. In addition, data processing may be performed prior to the exposure process. Data processing is a kind of preprocessing process for mask data, and may include grammar check for mask data, prediction of exposure time, and the like.

After preparing the mask data, a substrate for a mask is exposed based on the mask data (S440). Here, the exposure may include, for example, electron beam writing. Here, the electron beam writing may be performed by, for example, a gray writing method using a multi-beam mask writer (MBMW). In addition, the electron beam writing may be performed using a variable shape beam (VSB) exposure machine.

After the mask data preparation operation, a process of converting the mask data into pixel data may be performed before the exposure process. The pixel data is data directly used for actual exposure, and may include data regarding a shape to be exposed and data regarding a dose assigned to each data. Here, the shape data may be bit-map data in which shape data, which is vector data, is converted through rasterization or the like.

After the exposure process, a mask is formed by performing a series of processes (S450). The series of processes may include, for example, development, etching, and cleaning. In addition, the series of processes for forming the mask may include a measurement process, a defect inspection process, or a defect repair process. In addition, a pellicle application process may also be included. Here, the pellicle application process may include a process of attaching a pellicle to a mask surface to protect the mask from subsequent contamination during a delivery of the mask and a useful life of the mask when it is confirmed that there are no contaminating particles or chemical stains through final cleaning and inspection.

In the method of manufacturing an EUV mask according to an embodiment of the present inventive concept, by performing MR-CROPC, diffraction efficiency may be improved and process costs may be significantly reduced at the same time.

Figure 13:
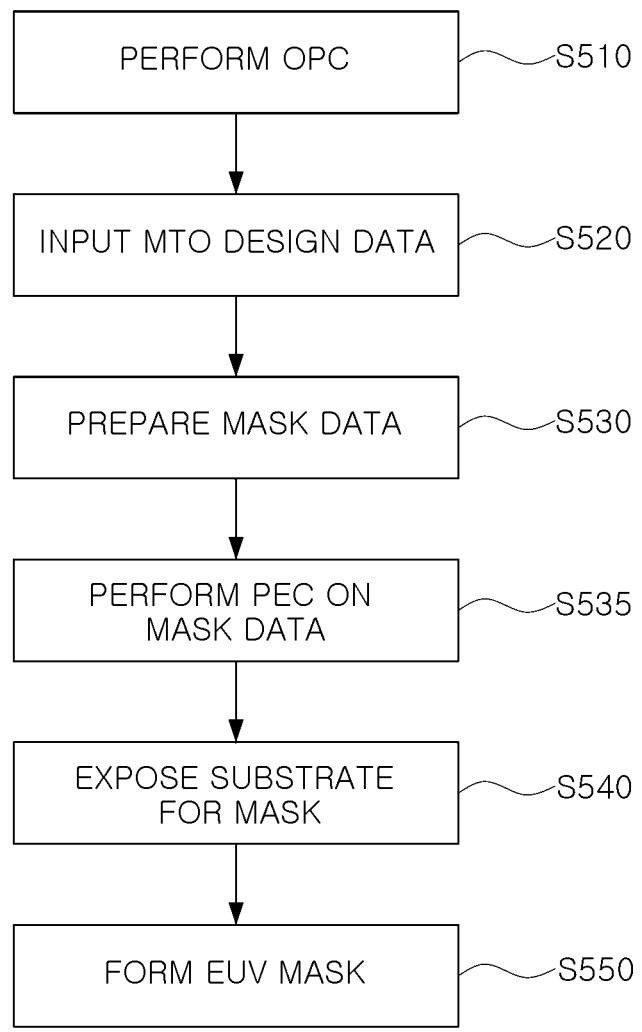
FIG. 13 is a flowchart illustrating a method of manufacturing an EUV mask according to another embodiment of the present inventive concept.

FIG. 13 is a flowchart illustrating a method of manufacturing an EUV mask according to another embodiment of the present inventive concept. Referring to FIG. 13, the method of manufacturing an EUV mask of the present inventive concept is similar to that of FIG. 12, but may further include an operation (S535) of performing proximity effect correction (PEC) on the mask data after an operation (S520) of inputting MTO design data and an operation (S530) of preparing mask data. This PEC refers to a process of correcting an error caused by electron beam proximity effect, e.g., electron beam scattering. For example, in the electron beam exposure process, a phenomenon in which a high acceleration voltage used to generate an electron beam scatters together with the atoms of a resist and a material located therebelow as high kinetic energy is applied to electrons, and such a phenomenon is commonly referred to as the electron beam proximity effect. The electron beam proximity effect may be modeled with two Gaussian functions or an empirically determined proximity function, and the electron beam proximity effect may be corrected based on those functions.

A proximity effect correction most commonly used to correct an error caused by the electron beam proximity effect is a method of compensating for a dose changed due to scattering by changing a dose during an actual exposure. For example, a region with a high pattern density may be assigned a relatively low dose, and relatively isolated and small shapes may be assigned a relatively high dose. Here, the dose may include an irradiation amount of the electron beam. The proximity effect correction may include a method of correcting an edge of a pattern shape or changing a size of the pattern shape. After performing PEC, an EUV mask is manufactured by performing an operation (S540) of exposing a substrate for a mask and an operation (S550) of forming an EUV mask.

Figure 14:
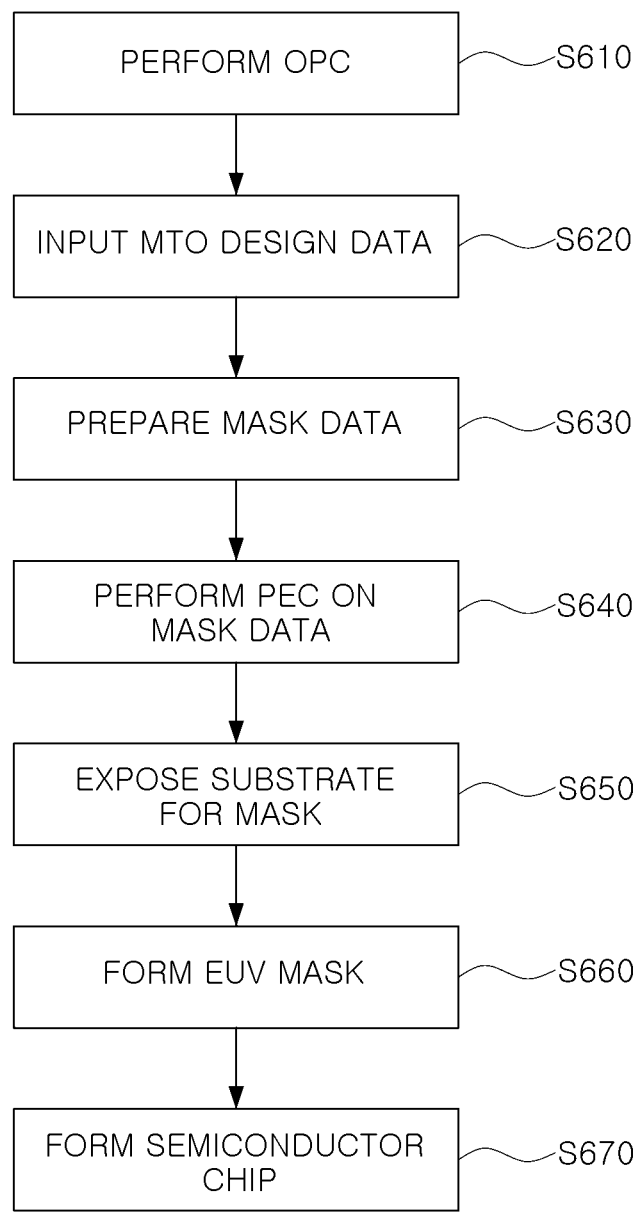
FIG. 14 is a flowchart illustrating a method of manufacturing a semiconductor chip/device according to an embodiment of the present inventive concept.

FIG. 14 is a flowchart illustrating a method of manufacturing a semiconductor chip/device according to an embodiment of the present inventive concept. Referring to FIG. 14, an EUV mask may be manufactured by performing an operation (S660) of forming an EUV mask after performing a series of operations S610 to S650 illustrated in FIG. 13. When the EUV mask is manufactured, various semiconductor device/chip manufacturing processes may be performed on a semiconductor substrate such as a wafer using the manufactured EUV mask to form a semiconductor device (S670). For example, the process using an EUV mask may typically include a patterning process through an EUV exposure process. A desired pattern may be formed on a semiconductor substrate or a material layer through the patterning process using the EUV mask.

The semiconductor device/chip manufacturing process may include a deposition process, an etching process, an ion process, a cleaning process, and the like. Here, the deposition process may include various material layer forming processes such as CVD, sputtering, spin coating, and the like. The ion process may include processes such as ion implantation, diffusion, and heat treatment. The semiconductor device/chip manufacturing process may further include a packaging process in which a semiconductor device is mounted on a PCB and sealed with a sealing material and/or a test process of testing a semiconductor device or package.

The present inventive concept discloses a cost effective OPC solution using a geometric limitation pattern definition of general OPC and a multi-moving edge. In an embodiment, a ME-CROPC application target pattern may be determined using a pattern search algorithm based on image parameters. In an embodiment, multiple correctable edges may be implemented with multiple target points by generating multi-edges. Edge placement error (EPE) convergence and multiple edge slope may be improved by applying corner rounding OPC.

In the present inventive concept, after MRC checking of ME-CROPC, mask may be manufactured through MDP. In an embodiment, a geometry search algorithm for defining a hot spot is disclosed. In an embodiment, an OPC solution that overcomes a diffraction limit by improving the multi-edge slope by generating a multi-moving edge is disclosed. An ideal OPC shape may be implemented as a rounding shape for effective diffraction. The OPC method according to an embodiment of the present inventive concept may reduce a process cost by single mask patterning using a double (LELE) patterning scheme.

The OPC method according to an embodiment of the present inventive concept may use a hot spot searching algorithm that considers both image parameters and MRC at the same time. In an embodiment, it is available as a single exposure patterning technique that overcomes MRC and diffraction limitations at a C2C pitch of 42.5 nm or less of contact/via requiring a double or triple mask. In an embodiment, an advantage of inverse lithography technique (ILT) may be implemented as a cost effective solution through multi-edge and corner rounding OPC.

The ME-CROPC method according to an embodiment of the present inventive concept may secure the effect of ILT OPC without OPC runtime penalty.

The ME-CROPC method according to an embodiment of the present inventive concept may improve image parameters and process variation by implementing a curvilinear shape maximizing edge slope improvement. ME-CROPC method according to an embodiment of the present inventive concept may reduce the cost of additional mask manufacturing by developing a single exposure process. ME-CROPC method according to an embodiment of the present inventive concept may secure mass-productivity of the product DB by developing a cost effective technology.

As set forth above, the OPC method, the mask manufacturing method and the semiconductor chip/device manufacturing method using the same according to an embodiment of the present inventive concept may perform multi-edge corner rounding OPC on a rectangular pattern, thereby performing low-cost and high-efficiency patterning.

While example embodiments have been shown and described above, it will be apparent to those skilled in the art that modifications and variations could be made without departing from the scope of the present inventive concept as defined by the appended claims.

What is claimed is:

1. A method of manufacturing a semiconductor chip, the method comprising:
    designing a layout for a semiconductor chip;
    performing a multi-edge optical proximity correction (OPC) on the layout;
    selecting a multi-edge corner rounding OPC shape target from the layout;
    performing a multi-edge corner rounding OPC on the selected multi-edge corner rounding OPC shape target;
    manufacturing a mask corresponding to the layout after performing the multi-edge OPC and the multi-edge corner rounding OPC; and
    manufacturing the semiconductor chip using the mask,
    wherein a plurality of OPC shapes corresponding to a rectangular pattern of the mask are included in an OPC model,
    wherein at least one of the plurality of OPC shapes includes a multi-edge OPC shape, and
    wherein at least one of the plurality of OPC shapes includes a multi-edge corner rounding OPC shape.

2. The method of claim 1, wherein the selecting the multi-edge corner rounding OPC shape target includes selecting the multi-edge corner rounding OPC shape target using at least one image parameter and mask rule check (MRC).

3. The method of claim 2, wherein the at least one image parameter includes a normalized image log slope (NILS) or a mask error enhancement factor (MEEF).

4. The method of claim 2, wherein the selecting the multi-edge corner rounding OPC shape target includes determining, as a hot spot, a pattern in which an NILS is less than a first value, a MEEF is greater than a second value, and the MRC is less than a third value, among rectangular patterns of the layout.

5. The method of claim 1, wherein
    the performing the multi-edge corner rounding OPC includes:
    generating a movable multi-edge by cutting a corner of the selected multi-edge corner rounding OPC shape target in a diagonal direction; and
    adding a control point onto each edge.

6. The method of claim 5, wherein the performing the multi-edge corner rounding OPC further includes calculating an edge placement error (EPE) at each control point.

7. The method of claim 5, wherein the performing the multi-edge corner rounding OPC further includes generating a contour by applying rounding by a radius set at every angle.

8. The method of claim 5, wherein the performing the multi-edge corner rounding OPC is iterated until an edge placement error EPE is minimized.

9. An optical proximity correction (OPC) method for manufacturing a semiconductor chip, the OPC method comprising:
    selecting a multi-edge target pattern among rectangular patterns;
    performing a multi-edge optical proximity correction OPC on the selected multi-edge target pattern by corner-chopping the selected multi-edge target pattern to generate a multi-edge OPC shape;
    generating an evaluation point on each multi-edge OPC shapes;
    selecting a multi-edge OPC shape as a target multi-edge OPC shape;
    performing a multi-edge corner rounding OPC on the target multi-edge OPC shape;
    calculating an edge placement error (EPE) at the evaluation point;
    determining whether a calculated value is lower than a previous iteration value;
    determining whether the number of performing the multi-edge corner rounding OPC on the target multi-edge OPC shape is a last iteration when the calculated value is lower than the previous iteration value;
    determining whether there is no mask rule check (MRC) violation when the number of performing the multi-edge corner rounding OPC on the target multi-edge OPC shape is the last iteration; and
    determining a final OPC shape when there is no MRC violation.

10. The OPC method of claim 9, wherein the number of multi-edge corresponding to the selected multi-edge target pattern is 5 to 8.

11. The OPC method of claim 9, further comprising iterating the performing the multi-edge corner rounding OPC on the target multi-edge OPC shape when the calculated value is not less than the previous iteration value, so that a difference between a contour generated according to a result of performing the a multi-edge corner rounding OPC on the target multi-edge OPC shape and a target is smaller than a previous value.

12. The OPC method of claim 9, further comprising iterating the performing the multi-edge corner rounding OPC on the target multi-edge OPC shape when the calculated value is less than the previous iteration value and the number of performing the multi-edge corner rounding OPC on the target multi-edge OPC shape is not the last, so that a difference between a contour generated according to a result of performing the multi-edge corner rounding OPC on the target multi-edge OPC shape and a target is smaller than a previous value.

13. The OPC method of claim 9, wherein
    the performing the multi-edge corner rounding OPC on the target multi-edge OPC shape further includes:
    setting a radius value for each angle; and
    performing rounding using the set radius value.

14. A method of manufacturing a mask for a semiconductor chip, the method comprising:
    performing an optical proximity correction (OPC) on a layout;
    receiving mask tape-out (MTO) design data after performing the OPC;
    performing mask data preparation after receiving the MTO design data;
    performing an exposure process on a substrate for a mask based on mask data using an electronic beam after performing the mask data preparation; and forming a mask by performing a developing, etching or cleaning process after the exposure process, wherein the performing the OPC includes:

selecting first targets, on which a first OPC is to be performed, among rectangular patterns;

selecting second targets, on which a second OPC is to be performed, among the first targets;

performing the first OPC on the first targets excluding the second targets; and performing the second OPC on the second targets, wherein the first OPC is a multi-edge OPC (MEOPC), and the second OPC is a multi-edge corner rounding OPC (ME-CROPC).

15. The method of claim 14, wherein the selecting the second targets includes selecting the second targets using an image parameter or a mask rule check (MRC).

16. The method of claim 14, wherein the performing the OPC further includes dividing a transmission cross coefficient for each slit region.

17. The method of claim 14, wherein the performing the OPC further includes setting an apodization value indicating a strength of a beam for each slit position.

\* \* \* \* \*